United States Patent [19]
Rohde et al.

[11] Patent Number: 5,450,713
[45] Date of Patent: Sep. 19, 1995

[54] AQUATIC WEED TRAP

[76] Inventors: Robert R. Rohde; Ronald R. Rohde, both of 2235 Allen Rd., Ortonville, Mich. 48462

[21] Appl. No.: 336,926

[22] Filed: Nov. 10, 1994

[51] Int. Cl.⁶ .............................................. A01D 44/00
[52] U.S. Cl. ........................................... 56/8; 37/316; 56/400.11; 294/53.5
[58] Field of Search ................... 56/8, 400.11; 37/316; 172/376; 30/279.4, 318; 294/19.2, 535.5

[56] References Cited

U.S. PATENT DOCUMENTS

| | | | |
|---|---|---|---|
| 97,420 | 11/1869 | Mayhew | 56/8 |
| 3,394,483 | 7/1968 | Taglioli | 37/316 X |
| 3,979,146 | 9/1976 | Berg | 56/400.11 X |
| 4,562,611 | 1/1986 | Marttinen | 294/53.5 X |

Primary Examiner—David J. Bagnell
Attorney, Agent, or Firm—Gifford, Krass, Groh, Sprinkle, Patmore, Anderson & Citkowski

[57] ABSTRACT

A device for removing undesirable aquatic vegetation from lake bottoms. The device includes a weed trap and an elongated handle pivotally mounted thereto. The trap is formed of mesh, screen, etc. and includes at least one flat side and an open top. A cutting bar is disposed along a top edge of the flat side. A releasable latch is provided to selectively latch the handle to the trap.

12 Claims, 2 Drawing Sheets

AQUATIC WEED TRAP

FIELD OF THE INVENTION

This invention relates to the field of aquatic weed cutters, and, more particularly to a hand held device which may be used to cut and remove undesirable vegetation from lake bottoms.

DESCRIPTION OF THE RELATIVE PRIOR ART

The presence of undesirable aquatic vegetation in inland lakes has become an increasing problem in recent years. These typically small, fresh water, inland lakes have become the repositories of increasing quantities of agricultural runoff, septic tank drainage, and human sewage, both treated and untreated. These problems have been exacerbated by increasing population pressures along inland lakeshores, as well as changing land use patterns.

Typically, riparian owners find such lakeshore property desirable because of its recreational and aesthetic qualities: such owners like to swim, fish, boat, water ski, etc. in the lake waters. However, many of these activities are impaired or even curtailed because of luxuriant lake bottom week growth in the increasingly nutrient rich waters of inland lakes. Thus, control of the vegetation becomes an escalating problem for the riparian owner.

Of course herbicide control of undesirable lake bottom vegetation is possible but, in most cases, has adverse environmental impacts. Overzealous use of herbicides may result in, for example, depletion of fish stocks. Thus, physical removal of the undesirable vegetation has come to be the environmentally preferred practice.

A number of prior approaches have been attempted to the problem of physically removing undesirable aquatic vegetation. Such approaches are shown in, for example, U.S. Pat. Nos.: 4,137,693; 4,375,299; 4,583,353; 4,999,982; and 5,079,905; as well as U.S. Design Pat. No. 190,822. Some of the devices shown in these patents are meant to be towed behind boats (U.S. Pat. Nos. 4,999,982; 4,583,353; and the design patent). U.S. Pat. No. 4,137,693 discloses a powered rig which is to be operated from shore. U.S. Pat. No. 5,079,905 discloses a floating weed rack which is dragged through the water by the user. Devices are also known which employ a high pressure stream of water to uproot the weeds from the lake bed; however, such devices can cause significant environmental damage to the lake bottom. One of the patents (U.S. Pat. No. 4,375,299) does show hand held, aquatic weeders with cutting blade. However, these patents show rather complex cutting blades, and do not provide any basket, screen or other means for catching cut weeds. Thus, there usefulness is limited.

What is needed is a simple to use, hand held device which can be used to clear lake bottoms of unwanted vegetation. What is also needed is such a device which includes means for containing the cut or uprooted weeds so that they will not have to be removed from the lake in a subsequent, separate operation. There is also a need for a device which is relatively simple and inexpensive to manufacture.

SUMMARY OF THE INVENTION

Disclosed and claimed herein is an aquatic weed cutting device which solves the problems with the prior art discussed above. In its broadest aspect, the device comprises a trap formed of first and second opposed sides, and two end panels which connect the first and second sides to form an open topped net or trap. The end panels and opposed sides are preferably formed of wire screening, mesh, or other material which permits weeds to be entrapped within and allows water to pass freely therethrough.

Attached to one of the first or second sides is an elongated handle by which a user may operate the device. In a preferred embodiment, the handle is attached an outside face of one of the two sides and is pivotally connected thereto, preferably by means of a pivot pin. Means are provided on at least one of one of the handle and the side of the trap to which it is pivotally attached for releasably attaching the handle to the trap.

A cutting blade is disposed on the other side of the trap along a forward edge thereof. The cutting blade is mounted on the trap so that a cutting edge formed thereon extends away therefrom. Thus, the device may be operated by grasping the unattached end of the handle and pulling the device in a direction toward the user; depending upon the exact design of the cutting edge, weeds will be cut off and/or uprooted from the lake bed. The action of pulling the device along the lake bottom will then cause water to flow through the trap, thus entrapping the loose weeds therein. By unlatching the release means, the trap may be pivoted away from the handle to permit the trap to swivel down for easy emptying.

In a preferred embodiment, the first side of the trap is flat, with the cutting blade disposed along its forward edge. The handle is mounted to the second side such that it extends up and away from the top at a suitable angle for comfortable operation, typically, about 50 or 60 degrees. Preferable, this is accomplished by simply attaching the two sides to each other at their bottom edges in the desired angular relationship, and then mounting a portion of the handle on the second side.

BRIEF DESCRIPTION OF THE DRAWINGS

The invention claimed herein is best understood by reference to the following detailed description in which:

DETAILED DESCRIPTION OF THE PREFERRED EMBODIMENTS

Figure 1:
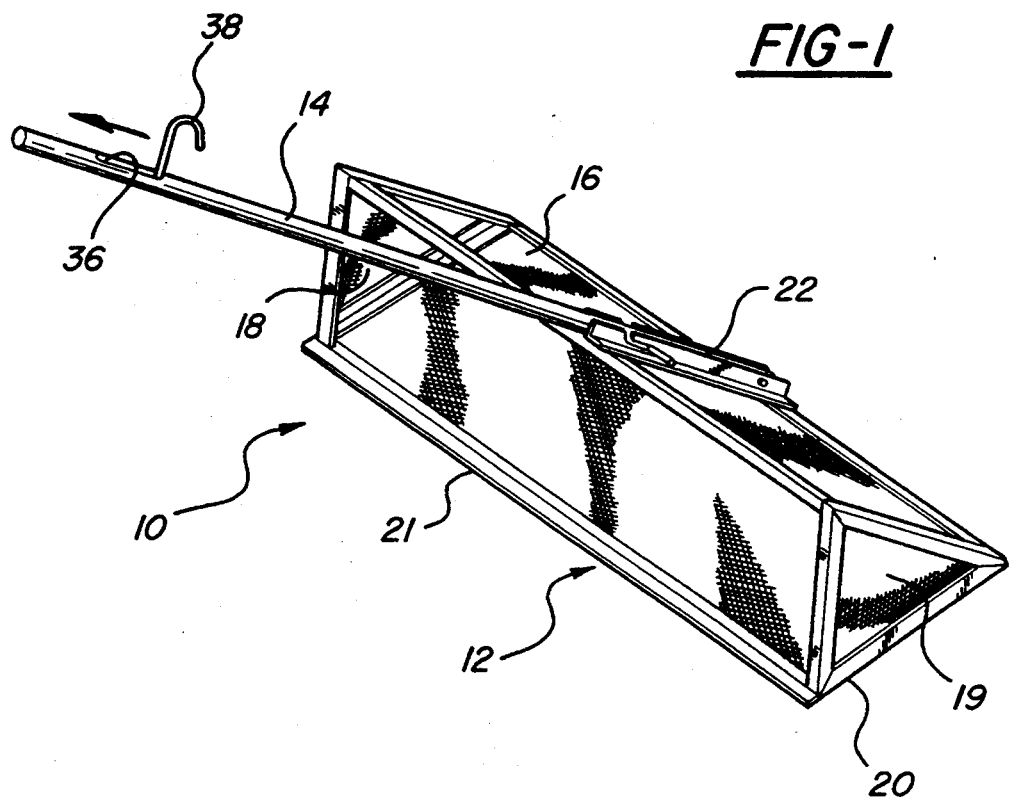
FIG. 1 is a perspective view of the aquatic weed cutting device of the present invention shown in is operational position.

Throughout the following detailed description, like numerals are used to reference the same element of the invention shown in multiple figures thereof. Referring now to the drawings, and in particular to FIG. 1, there is shown an aquatic weed cutting device 10 including a weed trap 12 and an elongated handle 14 pivotally mounted to the trap 12. The trap 12 includes first 17 and second 16 opposed sides. A pair of end panels 19 connect first and second sides 17 and 16 so as to form a trap 12 in the form of a basket having open top 18. In the view of the device 10 depicted in FIG. 1, the open top 18 faces toward the left, whereas in the view shown in FIG. 2, it faces toward the bottom. Disposed along a forward edge of the second side 17 is a cutting bar 20. It is mounted so that it extends away from the trap 12. Cutting bar 20 includes a cutting edge 21 formed thereon oriented so that it extends away from the trap 12.

Figure 2:
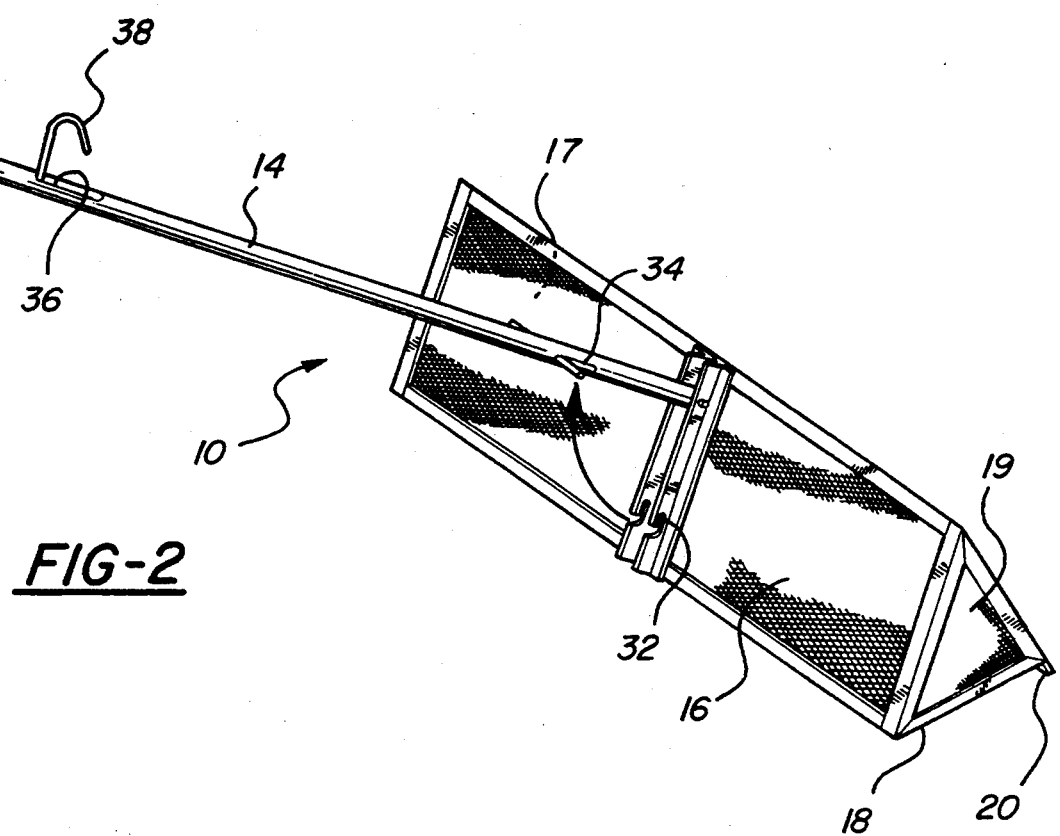
FIG. 2 is a perspective view of the device of FIG. 1 shown in its emptying position.
Figure 3:
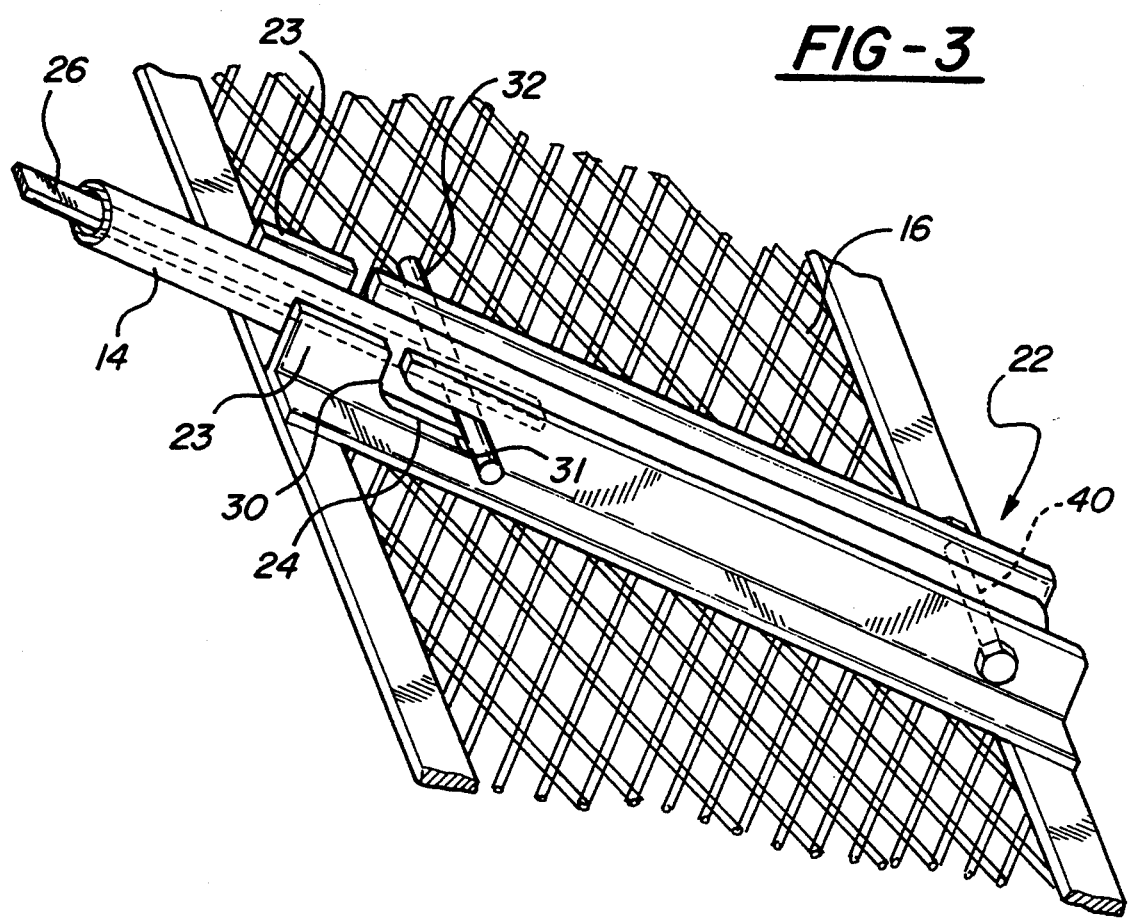
FIG. 3 is a detail view (partially cut away and with certain hidden features shown in phantom) of the releasable latching mechanism.

Handle 14 is pivotally mounted to second side 16 of trap 12 by means of a pivot pin 40 (best seen in the detailed view of FIG. 3). In the depicted embodiment, the pivot pin 40 is mounted on a bracket 22 which is formed by two opposed, spaced, parallel lengths 23 of angle aluminum (or other suitable material). These lengths 23 are spaced so as to permit a portion of handle 14 to pass therebetween, as is clearly shown in FIG. 3. Thus, the handle 14 may pivot with respect to the trap 12 from the operational position shown in FIG. 1 to the emptying position shown in FIG. 2.

Preferably, the trap 12 is fabricated with a frame of one inch by one-eighth inch angle aluminum to which suitably sized pieces of 0.081 flattened, expanded aluminum is spot welded or otherwise fastened thereto.

Preferably, the handle 14 is hollow and is formed of a suitable length of aluminum or similar tubing. Disclosed inside the hollow handle 14 is an elongated bar 26 (shown in FIG. 3) which carries a pin 32 thereon. Pin 32 is for coaction with a pair of slots 24 formed in each of the pair of lengths 23 of angle aluminum which form the bracket 22. Each slot 24 has a first open end 30 which communicates with a top edge of the respective length 23 and a second, blind end 31. Hollow handle 14 further includes a pair of slots 34 (one of which is depicted in FIG. 2) so that bar 26 may be slidingly reciprocated with respect to handle 14, slots 34 allowing sliding movement of pin 32. The coaction of pin 32 and slots 24 provides the means for releasably latching a handle 14 to the trap 12. When the device 10 is in its operational position, pin 32 extends through the pair of slots 24 proximate their blind ends 32. In this way the handle 14 is latched to the trap 12. Attached to bar 26 is a handle 38 which extends through another slot 36 formed in hollow handle 14 so that handle 38 may be used to reciprocate bar 26 with respect to handle 14. Thus, by grasping handle 38 and sliding it in the direction shown by the arrow in FIG. 1, pin 32 will be caused to travel along the length of slots 24, eventually reaching open ends 30. At this point, the handle 14 will be released from the trap 12, and the trap 12 will be allowed to pivot downward in the direction shown by the arrow in FIG. 2. In this position, any weeds entrapped in trap 14 may be easily emptied through the open top 18.

As depicted in FIG. 1, the cutting bar 20 has a straight, non-serrated cutting edge 21. However, the cutting bar 20 may be somewhat differently configured, such as with serrations, scallops or teeth, depending upon the type of vegetation to be removed. However, it has been found that the straight edge cutting bar 20 depicted in the drawings does an effective job of both cutting and uprooting undesirable lake bottom vegetation.

Figure 4:
FIG. 4 is a perspective view of the devices of the present invention in use.

In the depicted embodiment, the first side 17 is flat; second side 16 is joined directly to first side 17 at their bottom edges and makes an approximate 50 degree angle with respect thereto. Thus, when first side 17 rests on the ground, the handle 14 mounted to second side 16 will also be oriented at an approximate 50 degree angle with respect to the ground. It has been found that such an angular orientation of the handle with respect to the ground permits easy and efficient operation of the device. FIG. 4 shows a user operating the device of the present invention by simply pulling it toward himself along the lake bottom, causing the cutting bar to cut and/or uproot vegetation. The cut vegetation, because of the flow of water through the open top and out the closed bottom, is entrapped in the trap. The entrapped vegetation may be easily emptied from the trap by releasing it into the emptying position of FIG. 2.

A simple, easy to use, hand held device for removing aquatic vegetation from lake bottoms has been described with reference to particular embodiments and exemplifications thereof. However, it is to be understood that the device may be somewhat differently configured then is depicted and not depart from the scope of the present invention. For example, the trap is shown as having a cross-sectional configuration of an isosceles triangle with a fairly acute vertex angle. However, it is not necessary that the first and second sides of the trap meet as depicted; alternatively, they could be joined by an intervening, short side or bottom. Furthermore, the trap could include only one relatively flat side, with the rest being of curved configuration. Furthermore, while an example of a releasable latching mechanism has been depicted, it is to be understood that many alternative releasable latch designs would suggest themselves to one familiar with the prior art in this area. However, All such variations in design are considered to come within the scope of the present invention. Thus, it is the claims appended hereto and all reasonable equivalents thereof, rather than the exact depicted designs and embodiments, which define the true scope of the present invention.

We claim:

1. An aquatic weeding device comprising:
   a mesh trap having a first flat side, a second side angularly disposed with respect thereto, an open top, and two opposed side panels;
   a cutting bar disposed at a forward edge of said first side adjacent said open top;
   an elongated handle pivotally attached to said second side; and
   a releasable latch disposed on one of said handle and said second side for selectively fixing said trap to said handle such that said trap may be pivotally moved from a first position, wherein said second side is latched to said handle, to a second position, wherein said trap may pivot away from said handle for emptying.

2. The aquatic weeder of claim 1 wherein said elongated handle is hollow and said latch comprises:
   an elongated bar slidingly movable an said handle and having a latch pin extending through said bar approximate a first end thereof;
   a pair of post slots formed in said handle such that, when said bar is disposed inside said handle, said pin extends through said pair of post slots;
   a bracket disposed on an outer face of said second side and including a pair of opposed, spaced walls extending from said outer face such that a portion of said elongated handle may be received between said pair of opposed walls;
   a slot formed in each of said pair of opposed, spaced walls at a location thereon such that, when said portion of said handle is received between said pair of opposed, spaced walls, a portion of said pin projects therethrough, each of said slots having a first end communicating with a top edge of said side wall and a second, blind end;

means disposed on a second end of said bar for reciprocating said bar with respect to said handle such that said pin slides within said pair of slots from said second, blind ends thereof to latch said weeder in said first position, to the first, opened end of said slot to release said trap into said second position.

3. The aquatic weeding device of claim 2 wherein said first, open end of each of said slots extends away from said top of said trap, and said second, blind and each of said slots extends toward said top of said trap.

4. The device of claim 2 wherein said bracket comprises a pair of opposed, spaced, angle irons welded to said outer face of said second side.

5. The device of claim 2 further comprising a pivot pin attached to said bracket for pivotally attaching said elongated handle to said trap.

6. The device of claim 1 further comprising a pivot pin attached to an outer face of said second side for pivotally attaching said elongated handle to said trap.

7. The device of claim 1 wherein the device is formed of a material selected from a group consisting of: aluminum, steel, iron, polymeric materials, wood, laminates, and combinations thereof.

8. The device of claim 1 wherein said elongated handle further comprises a first free end and a second end pivotally attached to said trap, and said cutting bar further includes a cutting edge disposed on said cutting bar and extending toward said first end of said handle.

9. The device of claim 8 wherein the cutting edge is serrated.

10. The device of claim 1 wherein said first and second sides are oriented at an approximate 50 degree angle with respect to each other.

11. The device of claim 10 wherein the first and second sides are attached along bottom edges thereof.

12. An aquatic weeding device comprising:
- a water permeable trap having at least two mesh sides and an open top;
- a cutting bar disposed along a forward edge of one of said two mesh sides;
- an elongated handle pivotally attached to the other of said two mesh sides; and
- latching means operatively disposed with respect to said trap and said handle for selectively latching said trap to said handle.

* * * * *